(12) United States Patent
Wang et al.

(10) Patent No.: US 7,059,633 B2
(45) Date of Patent: Jun. 13, 2006

(54) HYBRID GAS INFLATOR

(75) Inventors: Jing-Huei Wang, Jungli (TW); Tai Ho Tsai, Taoyuan County (TW); Long-Ming Tsai, Taipei (TW)

(73) Assignee: Chung Shan Institute of Science & Technology, (TW)

( * ) Notice: Subject to any disclaimer, the term of this patent is extended or adjusted under 35 U.S.C. 154(b) by 260 days.

(21) Appl. No.: 10/692,742

(22) Filed: Oct. 27, 2003

(65) Prior Publication Data

US 2004/0222620 A1  Nov. 11, 2004

(51) Int. Cl.
  *B60R 21/26* (2006.01)
(52) U.S. Cl. .......................................... 280/737; 222/5
(58) Field of Classification Search ................ 280/741, 280/732, 727, 737; 222/3, 5
  See application file for complete search history.

(56) References Cited

U.S. PATENT DOCUMENTS

| | | | | |
|---|---|---|---|---|
| 3,774,807 A | * | 11/1973 | Keathley et al. ................ 222/3 |
| 5,570,904 A | * | 11/1996 | Cuevas ........................ 280/737 |
| 5,653,463 A | * | 8/1997 | Jeong .......................... 280/737 |
| 5,673,934 A | * | 10/1997 | Saccone et al. .............. 280/737 |
| 5,711,547 A | * | 1/1998 | Blumenthal et al. ........ 280/737 |
| 6,231,079 B1 | * | 5/2001 | Perotto et al. ............... 280/737 |
| 6,234,522 B1 | * | 5/2001 | Albrecht et al. ............. 280/737 |
| 6,254,128 B1 | * | 7/2001 | Albrecht et al. ............. 280/736 |
| 6,332,404 B1 | * | 12/2001 | Rink et al. ................... 102/530 |
| 6,464,254 B1 | * | 10/2002 | Chikaraishi et al. ......... 280/741 |
| 6,572,143 B1 | * | 6/2003 | Yamato et al. ............... 280/741 |
| 6,607,213 B1 | * | 8/2003 | Yamamori et al. ........... 280/736 |
| 6,634,302 B1 | * | 10/2003 | Rink et al. ................... 102/530 |
| 6,834,885 B1 | * | 12/2004 | Mizuno et al. .............. 280/737 |
| 6,857,657 B1 | * | 2/2005 | Canterberry et al. ........ 280/737 |
| 2002/0180195 A1 | * | 12/2002 | Nanmu ........................ 280/737 |
| 2004/0130133 A1 | * | 7/2004 | Yamazaki et al. ........... 280/737 |

* cited by examiner

*Primary Examiner*—David R. Dunn
*Assistant Examiner*—Drew Brown
(74) *Attorney, Agent, or Firm*—Bacon & Thomas PLLC

(57) ABSTRACT

A hybrid gas inflator utilizes a combustion chamber to generate a gas of hot jet. The gas pushes a piston downward and flows through a hole of the piston along its axis so as to break a pressure-resisting disc. The gas is then injected into a high-pressure gas container to heat up another gas therein. The hybrid gas gets expanded and is ejected through a plurality of exhaust outlets. This hybrid gas inflator can produce larger gas volume and therefore can reduce the size and weight of an inflator. Further, the impurities in the hybrid gas are congealed fast after two stages of pressure drop and can be removed easily by a filter.

11 Claims, 4 Drawing Sheets

HYBRID GAS INFLATOR

FIELD OF THE INVENTION

The present invention relates to a hybrid gas inflator, and more particularly to a hybrid gas inflator used in the airbags in vehicles.

BACKGROUND OF THE INVENTION

For providing passengers with safety protection in accidents, an air bag system has become a standard device of modern day vehicles.

The gas inflation devices of the prior art for car air bags are categorized into full pressurized-gas type, gas-generant type, and hybrid type. The full pressurized-gas type directly uses a high-pressure gas stored in a high-pressure container to inflate an air bag. It is a disadvantage that this mechanism needs a larger quantity of gas and therefore the weight and size of the gas container cannot be too small. On the other hand, the gas-generant type uses propellant or pyrotechnics to generate a high-pressure gas to inflate an air bag; therefore, the size of the inflation device can be made small. But the solid impurities in the gas, a byproduct of combustion, are hazardous to humans and the environment. It is a further disadvantage that the hot gas may burn an air bag during a charging process. The hybrid type uses less amount of propellant or pyrotechnics to heat up and thereby expand a gas stored in a high-pressure container; therefore, the gas container can be small.

It is a further consideration that a pressure-resisting disc, without further supportive components, seals the conventional high-pressure gas container. Therefore, the thickness of the pressure-resisting disc should be precisely designed that it not only sustain the gas pressure in the container but also can be easily broken when the charging process is activated. An improperly designed pressure-resisting disc may break up accidentally and cause a hazard to the passengers.

SUMMARY OF THE INVENTION

Accordingly, the primary object of the present invention is to provide a hybrid gas inflator that ejects a hot gas (a second gas), generated in a combustion chamber, into a high-pressure gas container to heat up another gas (a first gas) therein. The rapid thermal expansion of the hybrid gas increases the pressure available for charging an air bag, so that the size and weight of the inflation device is significantly reduced.

A second object of the present invention is to provide a hybrid gas inflator, wherein the impurities in the second gas ejected from the combustion chamber experiences two stages of condensation so that the impurities in the gas are mostly congealed and can be easily filtered out.

It is a further object of the present invention that the bottom end of the axle of the piston supports against the pressure-resisting disc so as to prevent it from accidental breakup.

It is a further object of the present invention that the second gas has exhausted its heat content during the process of heating up the first gas; therefore, the inflation device is safe and reliable.

To achieve the above objects, the present invention mainly comprises a high-pressure gas container, a connecting ring, a piston, and a combustion chamber. The high-pressure gas container contains a first gas therein and has an opening sealed by a pressure-resisting disc. An extension ring portion is formed around the opening of the high-pressure gas container, which has at least one exhaust outlet opened in radial direction. A connecting ring is received within the extension ring portion. A partition plate at the middle level of the connecting ring separates the connecting ring into an upper ring and a lower ring. The lower ring has at least one gas outlet opened radially. The partition plate has a first central hole opened toward an axial direction. A piston includes an axle passing through the first central hole and sliding along the axial direction, a pressure-receiving portion formed on a top end of the axle. The bottom end of the axle extends to against the pressure-resisting disc covering the opening of the high-pressure gas container. The axle further contains an axial hole extending axially from the top end to the bottom end inside the axle. A combustion chamber, fixed within the extension ring portion, contains a predetermined amount of second gas generant therein. The combustion chamber has a gas exit corresponding to the pressure-receiving portion of the piston.

A second gas is generated by means of burning the second gas generant and escapes from the gas exit so as to press the pressure-receiving portion and to drive the piston to move axially along the axial direction. The axially moving axle, together with an axially flow of hot jet of the second gas passing through the axial hole therein, breaks the pressure-resisting disc. The second gas enters into the high-pressure gas container to mix with and heat up the first gas in the high-pressure gas container. The first gas and the second gas forming a hybrid gas and flow out through the gas outlet of the connecting ring and the exhaust outlet of the extension ring portion.

Because the hot second gas from the combustion chamber simultaneously pushes the piston to break the pressure-resisting disc that seals the high-pressure gas container and flows into the axial hole of the piston, the first gas gets heated up and expanded by mixing with the second gas, and then gets ejected from the high-pressure gas container through of the exhaust outlet. The rapid thermal expansion of the hybrid gas increases the pressure available for charging an air bag, so that the size and weight of the inflation device is significantly reduced. Further, because the bottom end of the piston axle runs deep inside the high-pressure gas container, the mixing is sufficient and the heating is therefore efficient.

Further, when the second gas flows through the axial hole of the piston into the much wider high-pressure gas container, it expands and gets cooled; a first-stage process of condensation then occurs by which the majority of impurities in the second gas are congealed and will be kept in the container. As the hybrid gas of the first gas and the second gas flows out of the opening, a sudden pressure drop causes a further temperature decrease and therefore initiates a second-stage process of condensation. The impurities remained in the second gas are then solidified. A filter mesh covering the exhaust outlet of the extension ring portion can easily filter out these solid residues.

Further, when the inflation device of present invention is not in use, the axle of the piston can support the pressure-resisting disc to prevent it from accidental breakup.

The various objects and advantages of the present invention will be more readily understood from the following detailed description when read in conjunction with the appended drawings.

DETAILED DESCRIPTION OF THE PREFERRED EMBODIMENTS

Figure 1:
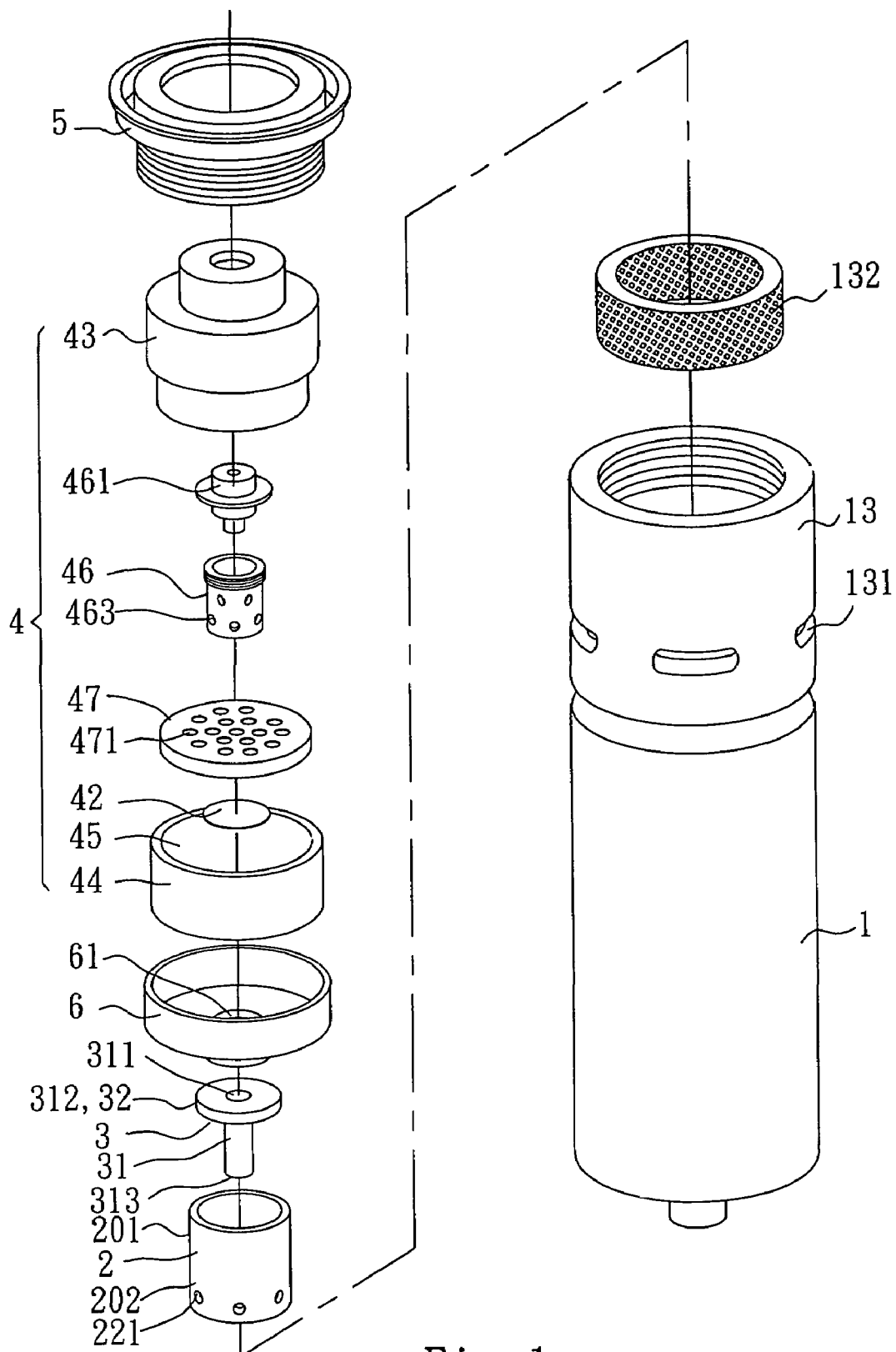
FIG. 1 is an exploded view of a preferred embodiment according to the present invention.
Figure 2:
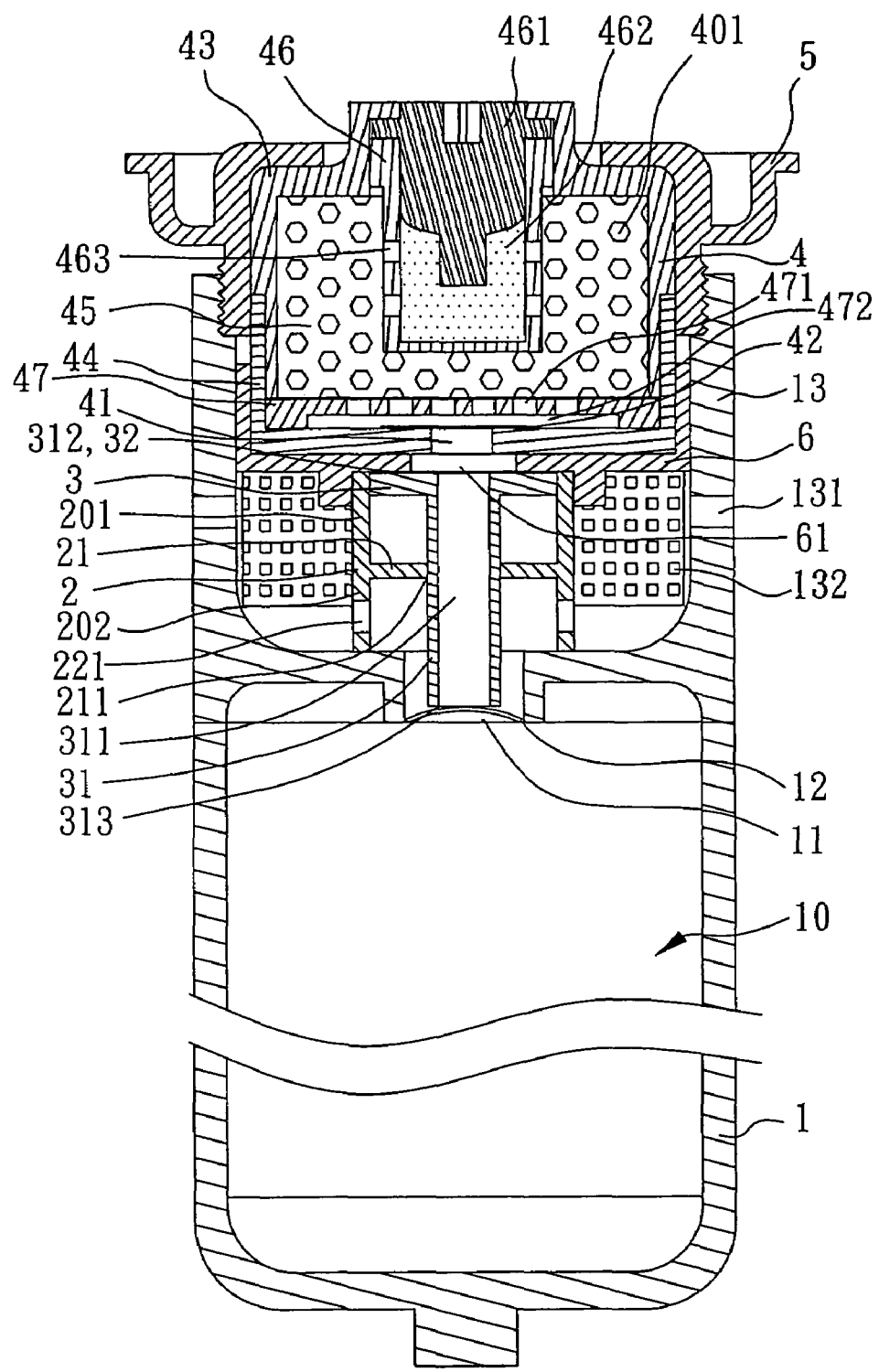
FIG. 2 is a cross-sectional view of a preferred embodiment according to the present invention.

Referring to FIG. 1, a hybrid gas inflator according to the present invention comprises a high-pressure gas container 1, a connecting ring 2, a piston 3, and a combustion chamber 4. FIG. 2 shows a cross-sectional view of the present invention when a process of inflation has not activated. The high-pressure gas container 1 can be a steel gas cylinder or a gas cylinder made of other materials. In this embodiment it is a steel gas cylinder in which a first gas 10 is stored. An opening 11 is formed on the top of the high-pressure gas container 1 and sealed by a pressure-resisting disc 12. In this embodiment the pressure-resisting disc 12 is a stainless steel disc; it can also be made of an aluminum, a flexible metallic or a flexible non-metallic disc. Further, an extension ring portion 13 is formed on the top of high-pressure gas container 1 surrounding the opening 11. A plurality of exhaust outlets 131 in radial arrangement is formed on the wall of the extension ring portion 13.

The connecting ring 2 is received within the extension ring portion 13 and connected to the opening 11 of the high-pressure gas container 1. A partition plate 21 residing at the middle level of the connecting ring 2 divides the connecting ring 2 into an upper ring 201 and a lower ring 202. A plurality of gas outlets 221 in radial arrangement is formed on the wall of the lower ring 202. Further, a first central hole 211 is formed on the partition plate 21 at the center thereof, extending in the axial direction.

The piston 3 includes an axle 31 that passes through the first central hole 211 within the connecting ring 2. Guided by the first central hole 211, the piston 3 is allowed to slide along the axis of the connecting ring 2. An axial hole 311 is formed within the axle 31 along its axis, extending from the top end 312 of the axle 31 to the bottom end 313 of the axle 31. The top end 312 of the axle 31 is formed of a pressure-receiving portion 32, and the axle 31 is so extended that its bottom end 313 pushes against the pressure-resisting disc 12 at the opening 11 of the high-pressure gas container 1. Note that the bottom end 313 of the axle 31 pushing against the pressure-resisting disc 12 further prevents the hazardous accident of breakup of the pressure-resistive disc 12.

The combustion chamber 4, composed of an upper shell 43 and a lower shell 44 being screwed together, is fixed in the extension ring portion 13. The composition of the upper shell 43 and the lower shell 44 can also be achieved by rivet jointing or welding. The upper shell 43 and the lower shell 44 define a hollow chamber 45, which contains a combustion-enhancement space 46 at the center surrounded by the second gas generant 401. A gas exit 41 is formed on the bottom of the combustion chamber 4 facing to the pressure-receiving portion 32 of the piston 3. To protect the gas generant in the combustion chamber 4 from moisture, a seal foil 42 made of aluminum is used to seal the gas exit 41. The combustion chamber 4 is separated from the piston 3 by a tray 6 installed within the extension ring portion 13. The tray 6 has a second central hole 61 in the corresponding position to the gas exit 41 of the combustion chamber 4 and is in contact with the pressure-receiving portion 32 on the top end 312 of the axle 31. The combustion chamber 4 is locked within the extension ring portion 13 by screwing a top cover 5 to the upper rim of extension ring portion 13. The composition of the top cover 5 and the extension ring portion 13 can also be achieved by rivet jointing or welding.

Figure 3:
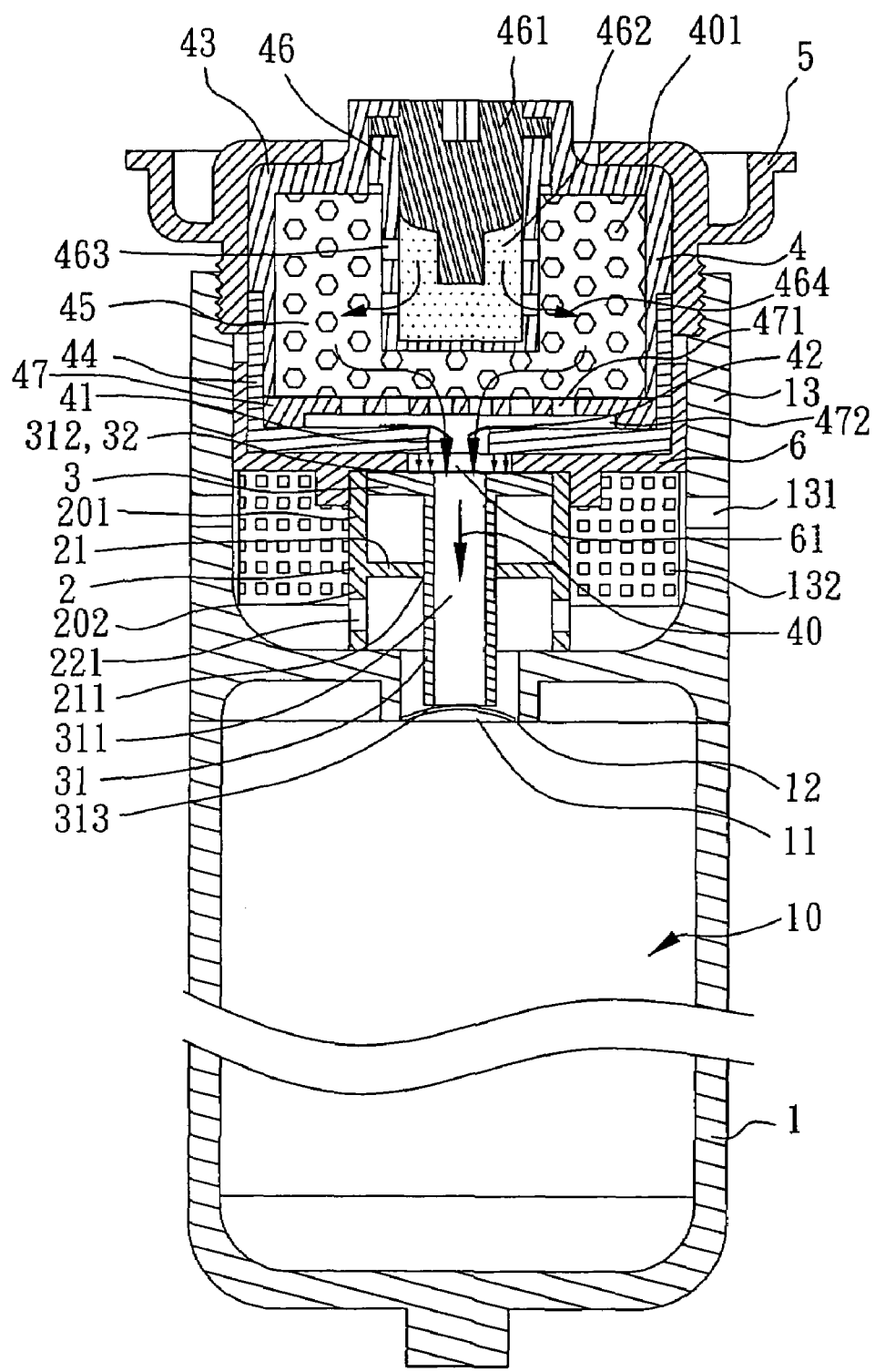
FIG. 3 illustrates the action of the combustion chamber of a preferred embodiment according to the present invention.

FIG. 3 shows the action of the combustion chamber 4 in the inflation process, wherein an igniter 461 in the combustion-enhancement space 46 ignites the combustion-enhancement 462 to produce a enhanced gas 464. The enhanced gas 464 flows through a plurality of gas outlets 463 on the wall of the combustion-enhancement space 46 into the hollow chamber 45 and then ignites the second gas generant 401 therein. The burning of the second gas generant 401 generates a second gas 40, which flows through a plurality of gas exiting holes 471 on a perforated plate 47, gathers in a space 472 and then breaks the seal foil 42 to leave the combustion chamber 4 through the gas exit 41.

Figure 4:
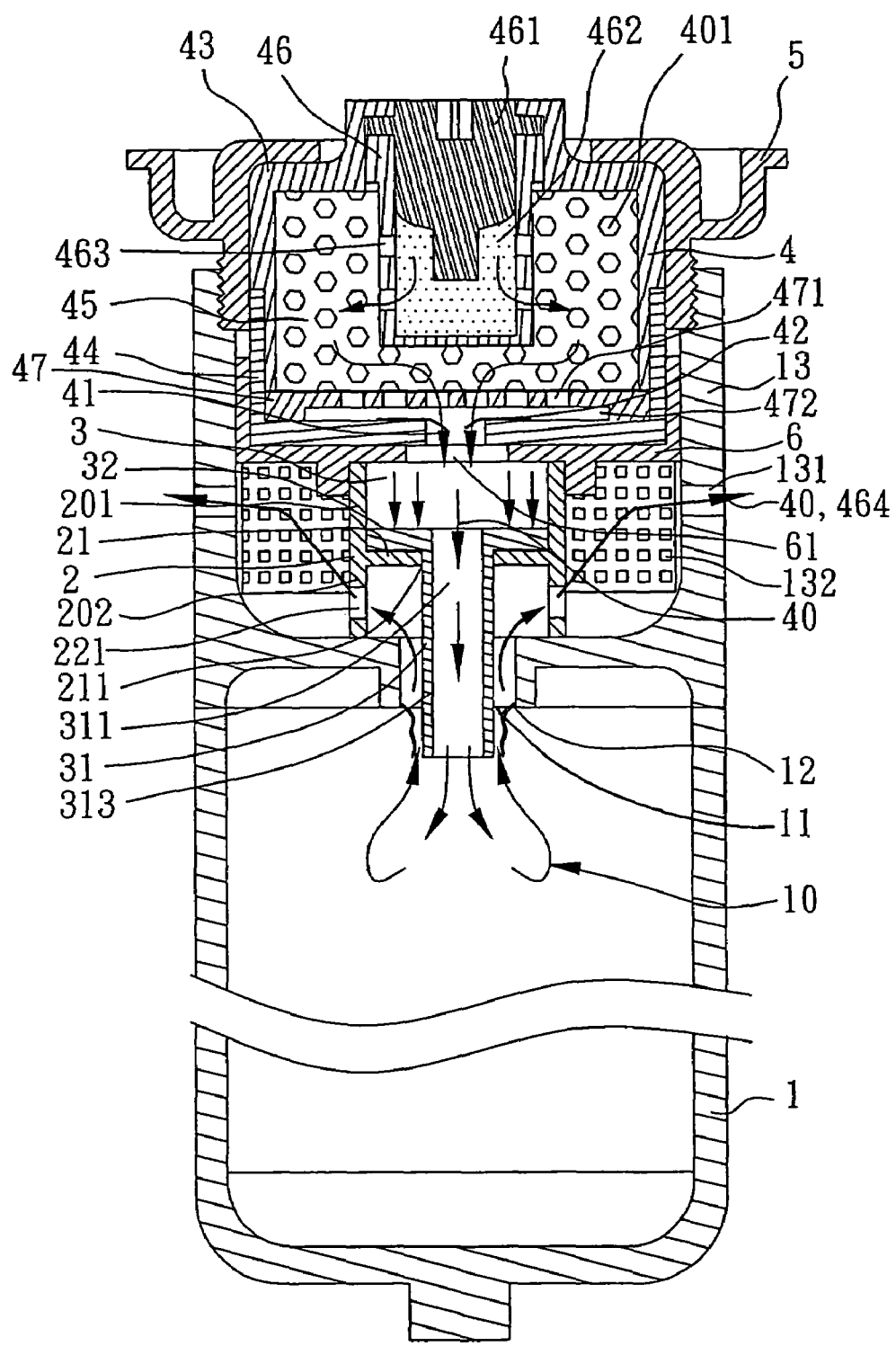
FIG. 4 illustrates the action of the piston of a preferred embodiment according to the present invention.

FIG. 4 shows the action of the piston 3 on the pressure-resisting disc 12 activated by the second gas 40. Since the second central hole 61 on the tray 6 is larger than the axial hole 311 in the piston 3, the second gas 40 ejected from the combustion chamber 4 exerts a force on the pressure-receiving portion 32 and thereby drives the piston 3 to move axially. The axially moving axle 31 of the piston 3 and the high-pressure hot jet flow in the axial hole 311 together break through the pressure-resisting disc 12, by which the second gas 40 flows into the high-pressure gas container 1 to mix with and heat up the first gas 10. The hybrid gas of the first gas 10 and the second gas 40 is ejected from the high-pressure gas container 1 through the opening 11, the gas outlet 221 of the connecting ring 2, and the exhaust outlets 131 of the extension ring portion 13. Because the second gas 40 generated by the combustion chamber 4 is hot, it can heat up and increase the pressure of the first gas 10 in the high-pressure gas container 1 before exiting the container. Therefore, the size and weight o the inflation device is significantly reduced. Note that, as an extra advantage, at the same time the axle 31 breaks the pressure-resisting disc 12, the bottom end 313 of the axle 31 intrudes deep into the high-pressure gas container 1, which makes the second gas 40 flow into the high-pressure gas container 1 deeply, and makes the mixing of the first gas 10 and the second gas 40 more efficient.

Further, when the second gas 40 flows through the axial hole 311 of the piston 3 into the much wider high-pressure gas container 1, it expands and gets cooled; a first-stage process of condensation then occurs by which the majority of impurities in the second gas 40 are congealed and will be kept in the container. As the hybrid gas of the first gas 10 and the second gas 40 flows out of the opening 11, a sudden pressure drop causes a further temperature decrease and therefore initiates a second-stage process of condensation. The impurities remained in the second gas 40 are then solidified. A filter mesh 132 covering the exhaust outlets 131 of the extension ring portion 13 can easily filter out these solid impurities.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hybrid gas inflator comprising:

a high-pressure gas container containing a first gas therein, said high-pressure gas container comprising an opening that is normally sealed by a pressure-resisting disc and an extension ring portion being formed around said opening; said extension ring portion having at least one exhaust outlet toward a radial direction;

a connecting ring being received within said extension ring portion, said connecting ring having a partition plate at a middle level therein which separates said connecting ring into an upper ring and a lower ring having at least one gas outlet opening radially; said partition plate having a first central hole extending along an axial direction;

a piston including an axle passing through said first central hole and sliding along said axial direction, a pressure-receiving portion that is formed on a top end of said axle, a bottom end of said axle extending to against said pressure-resisting disc that covers said opening of said high-pressure gas retainer, and an axial hole extending axially from said top end to said bottom end inside said axle; and a combustion chamber fixed within said extension ring portion, said combustion chamber containing a predetermined amount of second gas generant therein, and a gas exit being formed on a wall of said combustion chamber and facing to said pressure-receiving portion of said piston; wherein, a second gas being generated by means of burning said second gas generant and then escaping from said gas exit so as to press said pressure-receiving portion and to drive said piston to move axially along said axial direction; said axially moving axle, together with an axial flow of a hot jet of said second gas passing through said axial hole therein, breaking said pressure-resisting disc; said second gas entering into said high-pressure gas container to mix with and heat up said first gas in said high-pressure gas container; said first gas and said second gas forming a hybrid gas flowing out of said high-pressure gas container through said gas outlet of said connecting ring and said exhaust outlet of said extension ring portion; wherein said extension ring portion contains a tray for separating said piston and said combustion chamber; said tray having a second central hole facing said gas exit of said combustion chamber; said second central hole having a caliber greater than that of said axial hole of said piston.

2. The hybrid gas inflator of claim 1, wherein said combustion chamber is composed of an upper shell and a lower shell.

3. The hybrid gas inflator of claim 2, wherein said upper shell and said lower shell are screwed together.

4. The hybrid gas inflator of claim 1, wherein said combustion chamber contains a combustion-enhancement space for storing a predetermined amount of combustion-enhancement and an igniter; said igniter being utilized for igniting said combustion-enhancement so as to generate an enhanced gas.

5. The hybrid gas inflator of claim 4, wherein said combustion-enhancement space has at least one gas outlet through which said combustion-gas is ejected to bum said second gas generant.

6. The hybrid gas inflator of claim 1, wherein said combustion chamber has a seal foil sealing said gas exit to prevent said gas generant therein from moisture.

7. The hybrid gas inflator of claim 6, wherein said seal foil is an aluminum foil.

8. The hybrid gas inflator of claim 1, wherein said high-pressure gas container is a high-pressure steel gas cylinder.

9. The hybrid gas inflator of claim 1, wherein said pressure-resisting disc is made of stainless steel.

10. The hybrid gas inflator of claim 1, wherein said extension ring portion contains a filter mesh covering said exhaust outlet for filtering out impurities in an ejected gas and for reducing the speed of said ejected gas to achieve noise reduction.

11. The hybrid gas inflator of claim 1, wherein said combustion chamber is locked in said extension ring portion by screwing a top cover onto said extension ring portion.

* * * * *